June 3, 1969 W. GRAF 3,448,213
CIRCUIT ARRANGEMENT FOR THE TRANSMISSION OF TELEGRAPH MESSAGES OVER STORAGE COMMUNICATION SYSTEMS
Filed Jan. 18, 1965
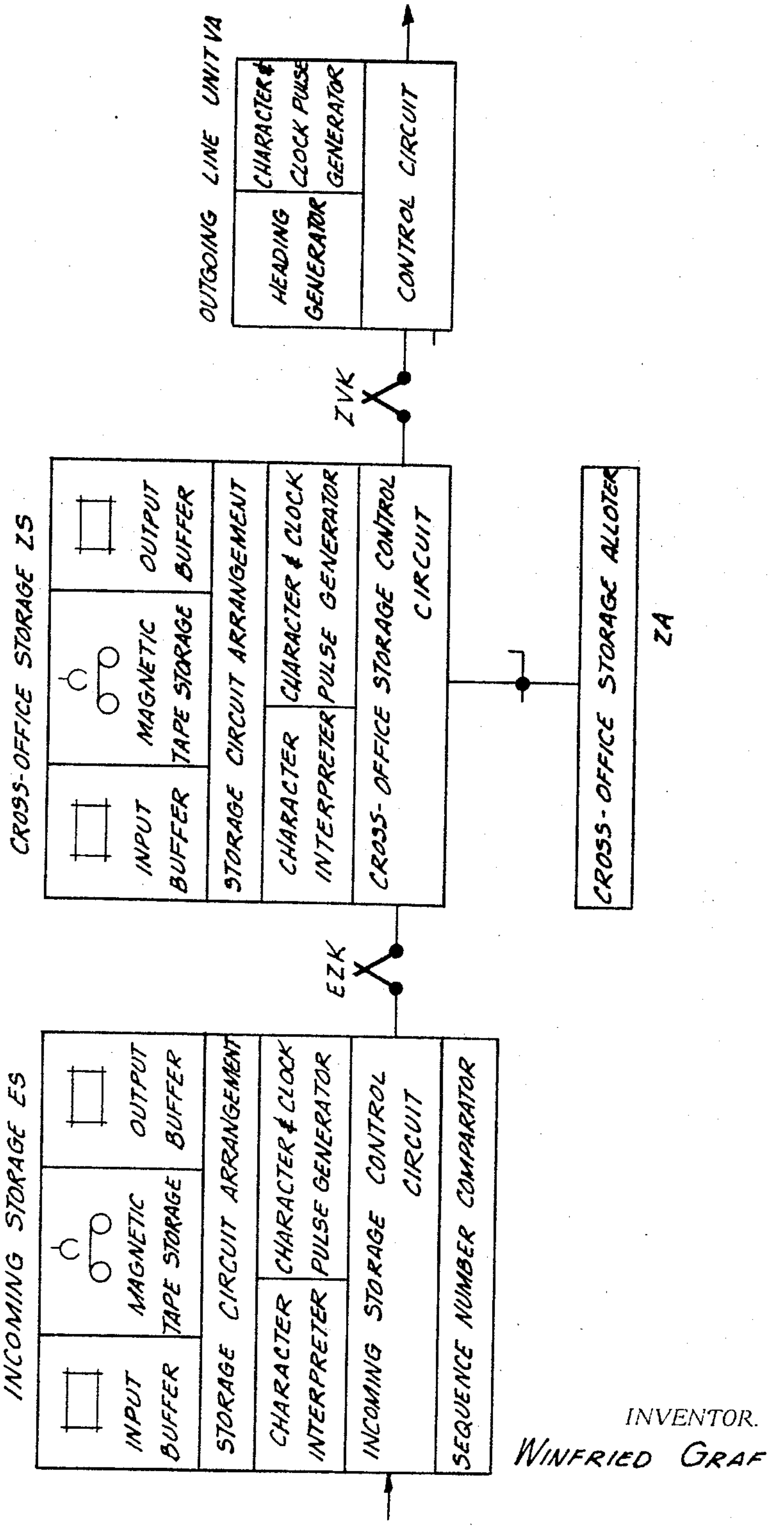
INVENTOR.
WINFRIED GRAF
BY United States Patent Office 3,448,213
Patented June 3, 1969

3,448,213
CIRCUIT ARRANGEMENT FOR THE TRANSMISSION OF TELEGRAPH MESSAGES OVER STORAGE COMMUNICATION SYSTEMS

Winfried Graf, Munich-Solln, Germany, assignor to Siemens Aktiengesellschaft, a corporation of Germany Filed Jan. 18, 1965, Ser. No. 426,123
Claims priority, application Germany, Jan. 20, 1964, S 89,140
Int. Cl. H04l 11/04, 17/16
U.S. Cl. 178—17.5 7 Claims

ABSTRACT OF THE DISCLOSURE

A circuit arrangement for the transmission of telegraph messages over storage units including temporary storage units which have different transmitting speeds. The respective transmitting speed of the temporary storage unit is determined by a timing pulse generator which is permanently associated with the outgoing transmission line.

BACKGROUND OF THE INVENTION

*Field of the invention*

This invention relates to a circuit arrangement for telegraph storage communications.

*Description of the prior art*

Early in telegraph technology it was recognized to use storage systems to prevent unbalanced utilization conditions of telegraph lines. The circuit arrangements of the prior art are known by the designation "storage transmission systems" and have, as a rule, input storage devices which record and store messages, as well as transmitting devices which send out messages over a desired line. To further improve the utilization of a given line, according to the prior art, intermediate storers are used in addition to input storers which may be permanently allocated to each input line or may be connectable over special devices to the input line. This type of arrangement, especially in the case of high demands on the line, has disadvantages in that a long waiting time occurs in the transmission. In order to overcome this disadvantage, according to the prior art, the telegraphing speed between input and intermediate storers is increased. Furthermore, for better utilization of the telegraph lines, it is likewise a known practice, to also increase the telegraphing speed of the lines themselves. Today, communication systems are known which operate at telegraphing speeds up to 75 Bd.

It will be apparent that the optimum utilization of lines could be achieved if it were possible to utilize an advantageous combination of the prior art methods. This is particularly useful whenever the number of telegraph lines is less than the number of messages to be communicated.

Telegraph storage communication systems are known which combine these principles. In such systems messages coming in over input storers are retransmitted to central intermediate storers, additionally, both within the exchange (intraexchange line between the input storers and the intermediate storers), and also on the lines between individual transmission exchanges operation is carried out at increased telegraphing speeds.

The proposals heretofore known for high speed telegraph storage transmission have drawbacks. Firstly, the telegraphing speed of the individual lines differ among one another in that they may have sending speeds which vary between 50 Bd and 75 Bd. Secondly, the intraexchange speed, in general, is different than the transmission speed of the individual transmission lines. Frequently operation is carried out at an intraexchange speed of 1200 Bd. This, however, requires that the input of the transmission of each transmission line be provided with a storer of its own which serves as a speed converter for the particular line connected thereto. It is also known practice to provide such storage systems as speed converters but, there is associated with such systems at least one bundling or group of transmission lines since these storers always operate at a predetermined telegraphing speed.

Therefore, frequently arising in modern storage transmission systems, there is a demand to change the transmitting speed of the various intermediate storers in order to connect the storers to desired transmission lines which are operated at a permanently set sending speed. This is accomplished, as a general rule, in the conventional storage communication systems by a manual switch-over. This method is not only disadvantageous in that the expenditure for switch-over devices is great but also that the speed of switch-over operation is relatively slow.

SUMMARY OF THE INVENTION

In order to overcome the disadvantages mentioned hereinabove the present invention provides means for automatically effecting the adaptation of the transmitting speed of the intermediate storer to the transmitting speed of the outgoing line. The intermediate storer is no longer fixed at a certain telegraphing speed but can transmit at all speeds depending on the particular line connected thereto.

This invention no longer utilizes the concept of carrying out the adaptation of various telegraphing speeds by adjustable timing means controlling the storer, but rather provides means which are in each case permanently allocated to the individual outgoing lines. According to this invention, this is accomplished by an arrangement wherein the individual combination steps of each telegraph character are read out of the intermediate storer at a speed determined by an impulse generator allocated to the output line that has been selected. This impulse generator is permanently set to operate at the transmitting speed of the line selected. Therefore, the switch-over device required of the prior art systems are completely eliminated. Furthermore, it is no longer necessary to provide monitoring devices through which the transmitting speed of a desired outgoing line is selected or adjusted before the transmission of the telegraph message from the intermediate storer. A further advantage of the present invention is obtained by the feature that the number of transmitting speeds at which it is possible to operate is no longer limited within a narrow range. substantially all forms of storage systems may be used. In the use of storage devices, such as tape storers, the storage output may be delivered through an output buffer storer, for example, one utilizing magnetic core technology.

BRIEF DESCRIPTION OF THE DRAWING

The drawing illustrates a block diagram of a telegraph system arranged in accordance with this invention.

DESCRIPTION OF THE PREFERRED EMBODIMENT

In the following there will be given a detailed explanation of the concepts of this invention. A fully automatic telegraph storage communication system is represented schematically on the drawing. The input storers ES are connectable to individual incoming lines and contain, in each case, an input and output buffer storer utilizing magnetic core technology. The transfer of the input storer ES to an intermediate storer ZS is accomplished at a high intraexchange speed of, for example 1200 Bd. The intermediate storer ZS transfers the message to a transmitting completing device VA. Therefore, there is no direct connection from the input device ES to the output device VA. The intermediate storers are centrally arranged so that they are accessible to each input storer over an input storer coupling field designated by EZK, and are available for connection to any outgoing transmission line through an intermediate storer transmission coupling field ZVK. The intermediate storer ZS can store several messages, all of which must be intended for the same transmitting direction and must have the same degree of urgency. The connections of the intermediate storer ZS with respect to the transmission coupling device VA is controlled through an intermediate storer-call-off circuit ZA depending on the waiting time of the individual intermediate storers and the urgency of the message.

From the above described operation, it is apparent that the transmission coupling device VA completes the transmissions to the outgoing line. In addition to the text-transmitter for the line selection message heading, and for a few other special texts, the transmission completion device VA contains a parallel series converter. The parallel series converter is permanently set to the transmitting speed of the line involved and which, according to this invention, is also utilized as an impulse generator for the transmission side of the intermediate storer connected thereto. It is an important feature of this invention that the combination steps of a telegraph character can be individually transmitted by the intermediate storer at the rate of the impulses generated by the impulse generator permanently allocated to the transmission line and, which is permanently set to the transmission speed of the line.

In detail, the operation may be described as follows:

After arrival of a first signal at an output buffer storer of the intermediate storer ZS, the intermediate storer-call-off circuit ZA is actuated to connect the intermediate storer ZS to the transmission device VA via the coupling field ZVK. This is accomplished after testing for a free transmission coupling device VA. Also during this operation a differentiation is made according to both the urgency and the waiting time of the message within the intermediate storer ZS. The intermediate storer ZS now begins the transmission and the transmission speed of the intermediate storer is dependent on the transmission speed of the connected outgoing line. In this arrangement there is provided at the output of the intermediate storer ZS an impulse from the impulse generator located in the transmission device VA and, which is fixed at the transmission speed of the outgoing line. To accomplish this, parallel-series converters, known per se, are used. The converters are used for controlling the transmission of the text-transmitter of the transmission device VA and for controlling the read-out of the individual steps of the telegraph characters from the output buffer storer of the intermediate storer ZS. Since there is provided in the output portion of the intermediate storer ZS a signal evaluation means, the transmission of the message is halted behind the old line-section message heading so that the transmission device VA is actuated for the start of a new message heading. For this purpose, the transmission device VA contains a text-transmitter chain. It is only at this time, through the impulses received from the impulse generator of the transmission device VA, that the rest of the message is read out from the output buffer storer of the intermediate storer ZS. The end of the message is recognized by a signal evaluation means whereupon the coupling field ZVK is released.

Accordingly, variations and modifications may be effected without departing from the spirit and scope of the novel concepts of this invention.

I claim:

1. A circuit arrangement for the transmission of telegraph characters over storage communication installations, comprising incoming lines, each of which is connectable to an input storer, and outgoing lines, each of which is provided with a transmission completing device permanently allocated thereto, an intermediate storer connectable with each input storer and each transmission device, over which the connection is effected, and an individual impulse generator permanently allocated to each outgoing line over which the stored telegraph characters are to be transmitted, and means connecting each said impulse generator and said intermediate storer whereby the transmitting speed of the intermediate storer is controlled by each generator individually.

2. A circuit arrangement according to claim 1, where in the intermediate storer there is included a tape storer and an output buffer storer allocated thereto.

3. A circuit arrangement according to claim 2, wherein said buffer storer includes magnetic core storage means.

4. A circuit arrangement according to claim 1, wherein the intermediate storer includes magnetic storage cores.

5. A circuit arrangement according to claim 1, wherein the impulse generator determining the transmitting speed of the intermediate storer is permanently set at the transmitting speed of the associated outgoing transmission line.

6. A circuit arrangement according to claim 1, wherein the impulse generator is a series-parallel converter.

7. A circuit arrangement according to claim 1, wherein the transmission of the individual steps of the telegraph characters from the intermediate storer is controlled by said impulse generator.

References Cited

UNITED STATES PATENTS

| | | | |
|---|---|---|---|
| 2,981,789 | 4/1961 | Wright et al. | 178—2 |
| 3,059,048 | 10/1962 | Lamin et al. | 178—17.5 |

THOMAS A. ROBINSON, *Primary Examiner.*

U.S. Cl. X.R.

340—174.1